United States Patent
Yao et al.

(10) Patent No.: US 12,034,657 B2
(45) Date of Patent: Jul. 9, 2024

(54) DOWNLINK CONTROL INFORMATION FOR REDUCED-COMPLEXITY DEVICE

(71) Applicant: Apple Inc., Cupertino, CA (US)

(72) Inventors: Chunhai Yao, Beijing (CN); Chunxuan Ye, San Diego, CA (US); Dawei Zhang, Saratoga, CA (US); Fangli Xu, Beijing (CN); Haijing Hu, Los Gatos, CA (US); Haitong Sun, Cupertino, CA (US); Hong He, San Jose, CA (US); Jie Cui, San Jose, CA (US); Oghenekome Oteri, San Diego, CA (US); Weidong Yang, San Diego, CA (US); Wei Zeng, San Diego, CA (US); Yang Tang, San Jose, CA (US); Yuchul Kim, San Jose, CA (US); Yuqin Chen, Beijing (CN); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 352 days.

(21) Appl. No.: 17/441,687

(22) PCT Filed: Feb. 12, 2020

(86) PCT No.: PCT/CN2020/074936
§ 371 (c)(1),
(2) Date: Sep. 21, 2021

(87) PCT Pub. No.: WO2021/159340
PCT Pub. Date: Aug. 19, 2021

(65) Prior Publication Data
US 2022/0200748 A1    Jun. 23, 2022

(51) Int. Cl.
*H04W 56/00* (2009.01)
*H04L 1/00* (2006.01)
(Continued)

(52) U.S. Cl.
CPC .......... *H04L 5/0044* (2013.01); *H04L 1/0003* (2013.01); *H04L 1/1812* (2013.01);
(Continued)

(58) Field of Classification Search
CPC ... H04L 5/0044; H04L 1/0003; H04L 1/1812; H04L 5/0064; H04W 72/23; H04W 72/0453
(Continued)

(56) References Cited

U.S. PATENT DOCUMENTS

2019/0165894 A1*  5/2019  Choi ................. H04W 72/1273
2019/0274032 A1   9/2019  Chatterjee et al.
(Continued)

FOREIGN PATENT DOCUMENTS

| CN | 107295671 | 10/2017 |
| CN | 109089322 | 12/2018 |
| WO | WO 2018165911 | 9/2018 |

OTHER PUBLICATIONS

"Liu, TW 17441687, Narrowband Communication for Different Device Capabilities in Unlicensed Spectrum, Oct. 1, 2021" (Year: 2017).*

(Continued)

*Primary Examiner* — Sai Ming Chan
(74) *Attorney, Agent, or Firm* — Fish & Richardson P.C.

(57) ABSTRACT

The implementations disclosed provide apparatus, systems, and methods for downlink control information (DCI) enhancement for a reduced-complexity new radio (NR) wireless device. The wireless device includes one or more processors configured to transmit a type of the wireless device to a base station communicatively coupled to the wireless device. A format of the DCI is received from the base station. The DCI includes multiple bit strings indicating a schedule of a physical downlink shared channel (PDSCH)

(Continued)

or a physical uplink shared channel (PUSCH). The format specifies a respective number of bits for each bit string. The format is defined by the base station based on the type of the wireless device. The DCI is received from the base station using a physical downlink control channel (PDCCH). The multiple bit strings are extracted from the DCI based on the format of the DCI.

20 Claims, 8 Drawing Sheets

(51) Int. Cl.
    H04L 1/1812      (2023.01)
    H04L 5/00        (2006.01)
    H04W 72/0453     (2023.01)
    H04W 72/23       (2023.01)
(52) U.S. Cl.
     CPC ....... *H04L 5/0064* (2013.01); *H04W 72/0453* (2013.01); *H04W 72/23* (2023.01)
(58) Field of Classification Search
     USPC .......................................................... 370/329
     See application file for complete search history.

(56) References Cited

U.S. PATENT DOCUMENTS

| | | | |
|---|---|---|---|
| 2020/0022144 A1* | 1/2020 | Papasakellariou | H04W 72/23 |
| 2020/0222146 A1* | 7/2020 | Komp | A61B 1/0005 |
| 2020/0382247 A1* | 12/2020 | Kwak | H04L 5/0094 |
| 2022/0095371 A1* | 3/2022 | Oh | H04L 27/2607 |
| 2023/0072551 A1* | 3/2023 | Sui | H04W 72/51 |

OTHER PUBLICATIONS

[No Author Listed], "3rd Generation Partnership Project; Technical Specification Group Radio Access Network; NR; Multiplexing and channel coding (Release 15)," 3GPP TS 38.212 V15.8.0, Dec. 2019, 101 pages.

[No Author Listed], "3rd Generation Partnership Project; Technical Specification Group Radio Access Network; NR; Physical layer procedures for control (Release 16)," 3GPP TS 38.213 V16.0.0, Dec. 2019, 146 pages.

[No Author Listed], "3rd Generation Partnership Project; Technical Specification Group Radio Access Network; NR; Physical layer procedures for data (Release 16)," 3GPP TS 38.214 V16.0.0, Dec. 2019, 147 pages.

[No Author Listed], "3rd Generation Partnership Project; Technical Specification Group Services and System Aspects; Service requirements for cyber-physical control applications in vertical domains; Stage 1 (Release 17)," 3GPP TS 22.104 V17.2.0, Dec. 2019, 76 pages.

[No Author Listed], "3rd Generation Partnership Project; Technical Specification Group Services and System Aspects; Study on Communication for Automation in Vertical Domains (Release 16)," 3GPP TR 22.804 V16.2.0, Dec. 2018, 196 pages.

[No Author Listed], "3rd Generation Partnership Project; Technical Specification Group Services and System Aspects; Study on enhancements for cyber-physical control applications in vertical domains; Stage 1 (Release 17)," 3GPP TR 22.832 V17.1.0, Dec. 2019, 91 pages.

Ericsson, "New SID on support of reduced capability NR devices," 3GPP TSG RAN Meeting #86, RP-193238, Sitges, Spain, Dec. 9-12, 2019, 5 pages.

International Preliminary Report on Patentability in International Appln. No. PCT/CN2020/074936, dated Aug. 25, 2022, 6 pages.

International Search Report and Written Opinion in International Appln. No. PCT/CN2020/074936, dated Nov. 17, 2020, 9 pages.

[No Author Listed], "3rd Generation Partnership Project; Technical Specification Group Radio Access Network; NR; Multiplexing and channel coding (Release 16)," 3GPP TS 38.212 V16.0.0, Dec. 2019, 152 pages.

\* cited by examiner

| FIELDS | DCI-FORMAT 1_0 | DCI FORMAT 1_1 | DCI FORMAT 1_2 URLLC | DCI FORMAT 1_3 NR LIGHT |
|---|---|---|---|---|
| IDENTIFIER FOR DCI FORMATS | 1 | 1 | 1 | 1 |
| DIFFERENTIATION OF DCI FORMAT | 1 | | | 1 |
| FDRA | RA TYPE 1 WITH SIZE DEPENDING ON THE ASSUMED BWP | RA TYPE 0 AND RA TYPE 1 WITH SIZE DEPENDING ON THE ACTIVE BWP | RA TYPE 0 AND RA TYPE 1 WITH SIZE DEPENDING ON THE ACTIVE BWP | SCHEDULING GRANULARITY: 1/2/4/8 |
| TDRA | 4 | 0/1/2/3/4 | 0/1/2/3/4 | 0/1/2/3/4 |
| VRB-TO-PRB MAPPING | 1 | 0/1 | 0/1 | 0/1 |
| MCS | 5 | 5 | 5 | 4 OR CONFIGURABLE |
| NDI | 1 | 1 | 1 | 1 |
| RV | 2 | 2 | 0/1/2 | 0/1/2 |
| HARQ PROCESS NUMBER | 4 | 4 | 0/1/2/3/4 | 2/3/4 |
| DAI | 2 | 0/2/4 | 0/1/2/4 | 2 |
| TPC FOR PUCCH | 2 | 2 | 2 | 2 |
| PUCCH RESOURCE INDICATOR | 3 | 3 | 0/1/2/3 | 3 |
| PDSCH-TO-HARQ FEEDBACK TIMING | 3 | 0/1/2/3 | 0/1/2/3 | 0/1/2/3 |
| PDSCH REPETITION NUMBER | | | | 0 OR 2 OR 3 |
| DCI REPETITION NUMBER | | | | 0 OR 2 |

FIG. 6

| FIELDS | DCI FORMAT 1_1 | DCI FORMAT 1_2 URLLC | DCI FORMAT 1_3 NR LIGHT |
|---|---|---|---|
| CARRIER INDICATOR | 0/3 | 0/1/2/3 | 0 |
| BWP INDICATOR | 0/1/2 | 0/1/2 | 0 |
| PRB BUNDLING SIZE INDICATOR | 0/1 | 0/1 | 0/1 |
| RATE MATCHING INDICATOR | 0/1/2 | 0/1/2 | 0/1/2 |
| ZP CSI-RS TRIGGER | 0/1/2 | 0/1/2 | 0/1/2 |
| ANTENNA PORT(S) | 4/5/6 | 0/4/5/6 | 0/4/5/6 |
| TRANSMISSION CONFIGURATION INDICATION | 0/3 | 0/1/2/3 | 0/1/2/3 |
| SRS REQUEST | 2/3 | 0/1/2/3 | 0/1/2/3 |
| DMRS SEQUENCE | 1 | 0/1 | 0/1 |
| PRIORITY INDICATOR | 0/1 for URLLC | 0/1 | 0 |
| MCS FOR TB2 | 5 | 0 | 0 |
| NDI FOR TB2 | 1 | 0 | 0 |
| RV FOR TB2 | 2 | 0 | 0 |
| CBG TRANSMISSION | 0/2/4/6/8 | 0 | 0 |
| CBG FLUSHING INFORMATION | 0/1 | 0 | 0 |

FIG. 7

| FIELDS | DCI FORMAT 0_0 | DCI FORMAT 0_1 | DCI FORMAT 0_2 URLLC | DCI FORMAT 0_3 NR LIGHT |
|---|---|---|---|---|
| IDENTIFIER FOR DCI FORMATS | 1 | 1 | 1 | 1 |
| DIFFERENTIATION OF DCI | 1 | | | 1 |
| FDRA | RA TYPE 1 WITH SIZE DEPENDING ON THE ASSUMED BWP | RA TYPE 0 AND RA TYPE 1 WITH SIZE DEPENDING ON THE ACTIVE BWP | RA TYPE 0 AND RA TYPE 1 WITH SIZE DEPENDING ON THE ACTIVE BWP WITH L I 2/4/8/16 | SCHEDULING GRANULARITY: 1/2/4/8 |
| TDRA | 0/1/3/4/5/6 FOR URLLC | 0/1/2/3/4 | 0/1/2/3/4/5/6 | 0/1/2/3/4 |
| FREQUENCY HOPPING FLAG | 1 | 0/1 | 0/1 | 0/1 |
| MCS | 0/1 FOR URLLC | 5 | 5 | 4 OR CONFIGURABLE |
| NDI | 5 | 1 | 1 | 1 |
| RV | 1 | 2 | 0/1/2 | 0/1/2 |
| HARQ PROCESS NUMBER | 2 | 4 | 0/1/2/3/4 | 2/3/4 |
| TPC FOR PUSCH | 4 | 2 | 2 | 2 |
| UL/SUL INDICATOR | 2 | 0/1 | 0/1 | 0/1 |
| PUSCH REPETITION | 0/1 | | | |
| DCI REPETITION NUMBER | | | | 0 OR 2 OR 3 |
| OLPC | 0/1/2 FOR URLLC | | | 0 OR 2 |
| PRIORITY INDICATOR | 0/1 FOR URLLC | | | |
| INVALID SYMBOL PATTERN INDICATOR | 0/1 FOR URLLC | | | |

FIG. 8

| FIELDS | DCI FORMAT 0_1 | DCI FORMAT 0_2 URLLC | DCI FORMAT 0_3 NR LIGHT |
|---|---|---|---|
| CARRIER INDICATOR | 0/3 | 0/1/2/3 | 0 |
| BWP INDICATOR | 0/1/2 | 0/1/2 | 0 |
| VRB-TO-PRB MAPPING | 1 | 0/1 | 0/1 |
| 1ST DAI | 1/2 | 1/2 | 1/2 |
| 2ND DAI | 0/2 | 0/2 | 0/2 |
| SRS RESOURCE INDICATOR | VARIABLE | VARIABLE | IDENTICAL TO DCI FORMAT 0_1 |
| PRECODING INFO & # OF LAYERS | 0/1/2/3/4/5/6 | 0/1/2/3/4/5/6 | 0/1/2/3/4/5/6 |
| ANTENNA PORT(S) | 2/3/4/5 | 0 or 2/3/4/5 | 0/2/3/4/5 |
| SRS REQUEST | 2/3 | 0/1/2/3 | 0/1/2/3 |
| CSI REQUEST | 0/1/2/3/4/5/6 | 0/1/2/3/4/5/6 | 0/1/2/3/4/5/6 |
| DMRS SEQUENCE INITIALIZATION | 0/1 | 0/1 | 0/1 |
| PTRS-DMRS ASSOCIATION | 0/2 | 0/2 | 0/2 |
| UL-SCH INDICATOR | 1 | 1 | 1 |
| BETA_OFFSET INDICATOR | 0/2 | 0/1/2 | 0/1/2 |
| CBG TRANSMISSION INFORMATION | 0/2/4/6/8 | 0 | 0 |
| OLPC |  | 0/1/2 | 0 |
| PRIORITY INDICATOR |  | 0/1 | 0 |
| INVALID SYMBOL PATTERN INDICATOR |  | 0/1 | 0 |

FIG. 9

Transmit, by a wireless device, a type of the wireless device to a base station communicatively coupled to the wireless device
1004

Receive, by the wireless device, a format of downlink control information (DCI) from the base station, the DCI including multiple bit strings indicating a schedule of a physical downlink shared channel (PDSCH) or a physical uplink shared channel (PUSCH), the format specifying, for each bit string of the multiple bit strings, a respective number of bits, wherein the format is defined by the base station based on the type of the wireless device
1008

Receive, by the wireless device, the DCI from the base station using a physical downlink control channel (PDCCH)
1012

Extract, by the wireless device, the multiple bit strings from the DCI based on the format of the DCI
1016

Determine, by the wireless device, the schedule of the PDSCH or the PUSCH from the multiple bit strings
1020

FIG. 10

DOWNLINK CONTROL INFORMATION FOR REDUCED-COMPLEXITY DEVICE

CLAIM OF PRIORITY

This is the U.S. National Phase Application under 35 U.S.C. § 371 of International Patent Application No. PCT/CN2020/074936 filed Feb. 12, 2020, the disclosure of which is incorporated herein by reference in its entirety.

TECHNICAL FIELD

This description relates generally to wireless devices, and more particularly to apparatus, systems, and methods for downlink control information (DCI) enhancement for a reduced-complexity new radio (NR) user equipment (UE) device.

BACKGROUND

Wireless communication systems are rapidly growing in use. Further, wireless communication technology has evolved from voice-only communications to also include the transmission of data, such as Internet and multimedia content. The use of reduced-complexity new radio (NR) user equipment (UE) devices poses challenges to the wireless communication systems because traditional methods for formatting parameters and settings can be inadequate for reduced-complexity UE.

SUMMARY

The implementations disclosed provide apparatus, systems, and methods for downlink control information (DCI) enhancement for a reduced-complexity new radio (NR) user equipment (UE) device or wireless device. The wireless device includes one or more processors configured to transmit a type of the wireless device to a base station communicatively coupled to the wireless device. A format of the DCI is received from the base station. The DCI includes multiple bit strings indicating a schedule of a physical downlink shared channel (PDSCH) or a physical uplink shared channel (PUSCH). The format specifies a respective number of bits for each bit string. The format is defined by the base station based on the type of the wireless device. The DCI is received from the base station using a physical downlink control channel (PDCCH). The multiple bit strings are extracted from the DCI based on the format of the DCI. The schedule of the PDSCH or the PUSCH is determined from the multiple bit strings.

In some implementations, the type of the wireless device can be an industrial sensor device having a communication latency less than 150 milliseconds (ms) and a communication bitrate less than 3 megabits per second (Mbps). The type of the wireless device can be a video surveillance device having a communication latency less than 750 ms and a communication bitrate in a range from 1.5 to 30 Mbps. The type of the wireless device can be a wearable device having a communication bitrate in a range from 4 to 200 Mbps.

In some implementations, the multiple bit strings include a particular bit string having a particular number of bits. The particular bit string indicates a modulation and coding scheme (MCS) specified by the base station. The particular number of bits is based on radio resource control (RRC) signaling performed by the wireless device.

In some implementations, the multiple bit strings include a particular bit string having a particular number of bits. The particular bit string indicates a number of hybrid automatic repeat request (HARD) processes specified by the base station. A communication latency of the wireless device is an increasing function of the particular number of bits.

In some implementations, the multiple bit strings include a particular bit string having a particular number of bits, the particular bit string indicating a number of repetitions of the PDSCH or the PUSCH specified by the base station, wherein a communication latency of the wireless device is an increasing function of the particular number of bits.

In some implementations, the format of the DCI comprises a cyclic redundancy check (CRC) encoded using a radio network temporary identifier (RNTI) assigned by the base station.

In some implementations, the multiple bit strings include a particular bit string indicating a number of repetitions of the DCI specified by the base station. A rate of extracting the multiple bit strings from the DCI increases as the number of repetitions of the DCI increases.

In some implementations, the multiple bit strings include a particular bit string indicating a frequency domain resource allocation (FDRA) specified by the base station

BRIEF DESCRIPTION OF THE DRAWINGS

FIG. 6 illustrates enhancements to downlink control information (DCI) for a reduced-complexity NR device.

FIG. 7 illustrates enhancements to DCI for a reduced-complexity NR device.

FIG. 8 illustrates enhancements to DCI for a reduced-complexity NR device.

FIG. 9 illustrates enhancements to DCI for a reduced-complexity NR device.

FIG. 10 illustrates a process of operation using enhanced DCI for a reduced-complexity NR device.

DETAILED DESCRIPTION

Figure 1:
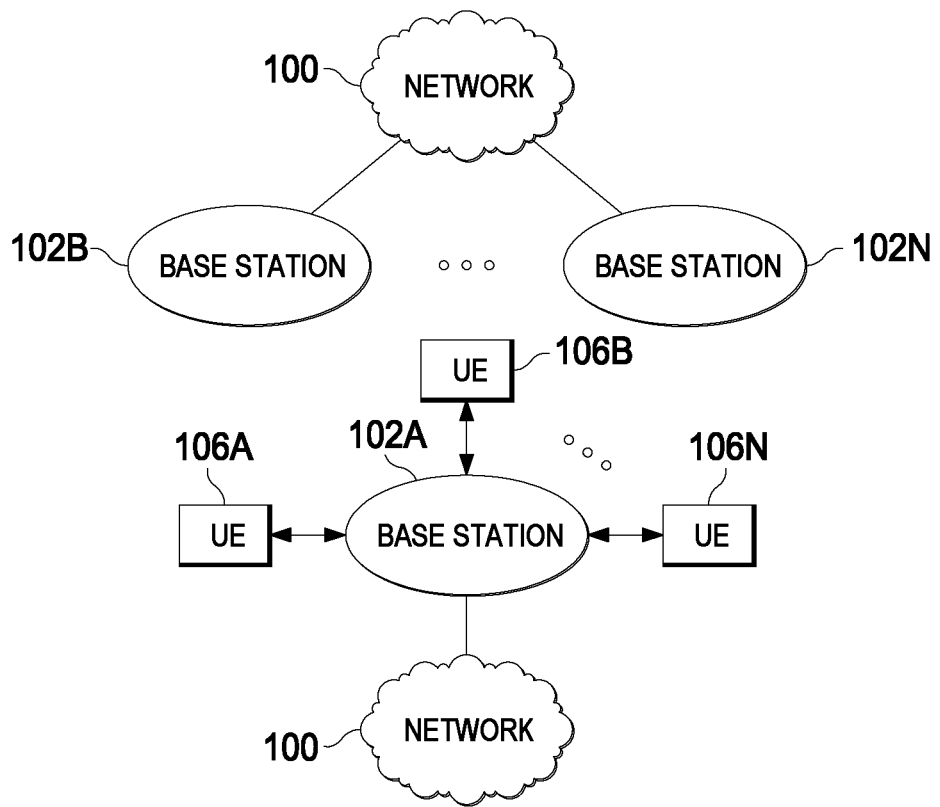
FIG. 1 illustrates an example wireless communication system.

The implementations disclosed provide apparatus, systems, and methods for downlink control information (DCI) enhancement for a reduced-complexity new radio (NR) user equipment (UE) device. The implementations enable reducing the cost and complexity of NR devices compared to higher-end enhanced mobile broadband (eMBB) devices and ultra-reliable low-latency communication (URLLC) devices. The implementations thus enable NR device design having a more-compact form factor that can also support the frequency range 1 (FR1) and frequency range 2 (FR2) bands for frequency division duplex (FDD) and time division duplex (TDD) operation. The physical downlink control channel (PDCCH) detection performance for the reduced-complexity NR device is increased, and the bit length of the DCI formats is reduced, thus enabling further performance improvements.

The following is a glossary of terms used in this disclosure.

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium can include other types of non-transitory memory as well or combinations thereof. In addition, the memory medium can be located in a first computer system in which the programs are executed, or can be located in a second different computer system which connects to the first computer system over a network, such as the Internet. In the latter instance, the second computer system can provide program instructions to the first computer for execution. The term "memory medium" can include two or more memory mediums which can reside in different locations, e.g., in different computer systems that are connected over a network. The memory medium can store program instructions (e.g., implemented as computer programs) that can be executed by one or more processors.

Carrier Medium—A memory medium as described above, as well as a physical transmission medium, such as a bus, network, and/or other physical transmission medium that conveys signals such as electrical, electromagnetic, or digital signals.

Programmable Hardware Element—Includes various hardware devices comprising multiple programmable function blocks connected via a programmable interconnect. Examples include Field Programmable Gate Arrays (FPGAs), Programmable Logic Devices (PLDs), Field Programmable Object Arrays (FPGAs), and Complex PLDs (CPLDs). The programmable function blocks can range from fine grained (combinatorial logic or look up tables) to coarse grained (arithmetic logic units or processor cores). A programmable hardware element can also be referred to as "reconfigurable logic".

Computer System—Any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—Any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—The term refers to various elements or combinations of elements that are capable of performing a function in a device, such as a user equipment or a cellular network device. Processing elements can include, for example: processors and associated memory, portions or circuits of individual processor cores, entire processor cores, processor arrays, circuits such as an Application Specific Integrated Circuit (ASIC), programmable hardware elements such as a field programmable gate array (FPGA), as well any of various combinations of the above.

Channel—A medium used to convey information from a sender (transmitter) to a receiver. It should be noted that since characteristics of the term "channel" can differ according to different wireless protocols, the term "channel" as used herein can be considered as being used in a manner that is consistent with the standard of the type of device with reference to which the term is used. In some standards, channel widths can be variable (e.g., depending on device capability, band conditions, etc.). For example, LTE can support scalable channel bandwidths from 1.4 MHz to 20 MHz. In contrast, WLAN channels can be 22 MHz wide while Bluetooth channels can be 1 MHz wide. Other protocols and standards can include different definitions of channels. Furthermore, some standards can define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—Refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure can be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form can be automatically filled out by the computer system where the computer system (e.g., software executing on the computer system) analyzes the fields of the form and fills in the form without any user input specifying the answers to the fields. As indicated above, the user can invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—Refers to a value that is almost correct or exact. For example, approximately can refer to a value that is within 1 to 10 percent of the exact (or desired) value. It should be noted, however, that the actual threshold value (or tolerance) can be application dependent. For example, in some implementations, "approximately" can mean within 0.1% of some specified or desired value, while in various other implementations, the threshold can be, for example, 2%, 3%, 5%, and so forth, as desired or as required by the particular application.

Concurrent—Refers to parallel execution or performance, where tasks, processes, or programs are performed in an at least partially overlapping manner. For example, concurrency can be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components can be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors can be configured to electrically connect a module to another module, even when the two modules are not connected). In some contexts, "configured to" can be a broad recitation of structure generally meaning "having circuitry that" performs the task or tasks during operation. As such, the component can be configured to perform the task even when the component is not currently on. In general, the circuitry that forms the structure corresponding to "configured to" can include hardware circuits.

Various components can be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

FIG. 1 illustrates an example wireless communication system. It is noted that the system of FIG. 1 is merely one example of a possible system, and that features of this disclosure can be implemented in any of various systems, as desired.

As shown, the example wireless communication system includes a base station 102A which communicates over a transmission medium with one or more wireless devices 106A, 106B, etc., through 106N. Each of the wireless devices can be referred to herein as a "communication device" or "user equipment" (UE). Thus, the wireless devices 106 are sometimes referred to as UEs or UE devices.

The base station (BS) 102A can be a base transceiver station (BTS) or cell site (a "cellular base station"), and can include hardware that enables wireless communication with the UEs 106A through 106N.

The communication area (or coverage area) of the base station can be referred to as a "cell." The base station 102A and the UEs 106 can be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1xRTT, 1xEV-DO, HRPD, eHRPD), etc. Note that if the base station 102A is implemented in the context of LTE, it can alternately be referred to as an "eNodeB" or "ceNB." Note that if the base station 102A is implemented in the context of 5G NR, it can alternately be referred to as "gNodeB" or "gNB."

As shown, the base station 102A can also be equipped to communicate with a network 100 (e.g., a core network of a cellular service provider, a telecommunication network such as a public switched telephone network (PSTN), and/or the Internet, among various possibilities). Thus, the base station 102A can facilitate communication between the user devices and/or between the user devices and the network 100. In particular, the cellular base station 102A can provide UEs 106 with various telecommunication capabilities, such as voice, SMS and/or data services.

Base station 102A and other similar base stations (such as base stations 102B . . . 102N) operating according to the same or a different cellular communication standard can thus be provided as a network of cells, which can provide continuous or nearly continuous overlapping service to UEs 106A-N and similar devices over a geographic area via one or more cellular communication standards.

Thus, while base station 102A can act as a "serving cell" for UEs 106A-N as illustrated in FIG. 1, each UE 106 can also be capable of receiving signals from (and possibly within communication range of) one or more other cells (which might be provided by base stations 102B-N and/or any other base stations), which can be referred to as "neighboring cells." Such cells can also be capable of facilitating communication between user devices and/or between user devices and the network 100. Such cells can include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some implementations, base station 102A can be a next generation base station, e.g., a 5G New Radio (5G NR) base station, or "gNB." In some implementations, a gNB can be connected to a legacy evolved packet core (EPC) network and/or to a NR core (NRC) network. In addition, a gNB cell can include one or more transition and reception points (TRPs). In addition, a UE capable of operating according to 5G NR can be connected to one or more TRPs within one or more gNBs.

Note that a UE 106 can be capable of communicating using multiple wireless communication standards. For example, the UE 106 can be configured to communicate using a wireless networking (e.g., Wi-Fi) and/or peer-to-peer wireless communication protocol (e.g., Bluetooth, Wi-Fi peer-to-peer, etc.,) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1xRTT, 1xEV-DO, HRPD, eHRPD), etc.). The UE 106 can also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

Figure 2:
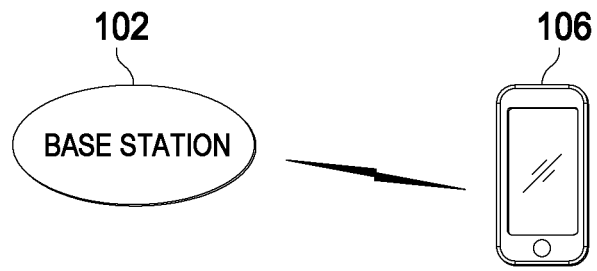
FIG. 2 illustrates a base station (BS) in communication with a user equipment (UE) device.

FIG. 2 illustrates a base station (BS) in communication with a user equipment (UE) device. For example, the UE 106 (e.g., one of the devices 106A through 106N) is in communication with a base station 102, according to some implementations. The UE 106 can be a device with cellular communication capability such as a mobile phone, a hand-held device, a computer or a tablet, or virtually any type of wireless device.

The UE 106 can include a processor that is configured to execute program instructions stored in memory. The UE 106 can perform any of the method implementations described herein by executing such stored instructions. Alternatively, or in addition, the UE 106 can include a programmable hardware element such as a field programmable gate array (FPGA) that is configured to perform any of the method implementations described herein, or any portion of any of the method implementations described herein.

The UE 106 can include one or more antennas for communicating using one or more wireless communication protocols or technologies. In some implementations, the UE 106 can be configured to communicate using, for example, CDMA2000 (1×RTT/1×EV-DO/HRPD/eHRPD) or LTE using a single shared radio and/or GSM or LTE using the single shared radio. The shared radio can couple to a single antenna, or can couple to multiple antennas, such as for multiple input multiple out (MIMO) for performing wireless communications. In general, a radio can include any combination of a baseband processor, analog RF signal processing circuitry (e.g., including filters, mixers, oscillators, amplifiers, etc.,), or digital processing circuitry (e.g., for digital modulation as well as other digital processing). Similarly, the radio can implement one or more receive and transmit chains using the aforementioned hardware. For example, the UE 106 can share one or more parts of a receive and/or transmit chain between multiple wireless communication technologies, such as those discussed above.

In some implementations, the UE 106 can include separate transmit and/or receive chains (e.g., including separate antennas and other radio components) for each wireless communication protocol with which it is configured to communicate. As a further possibility, the UE 106 can include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 3:
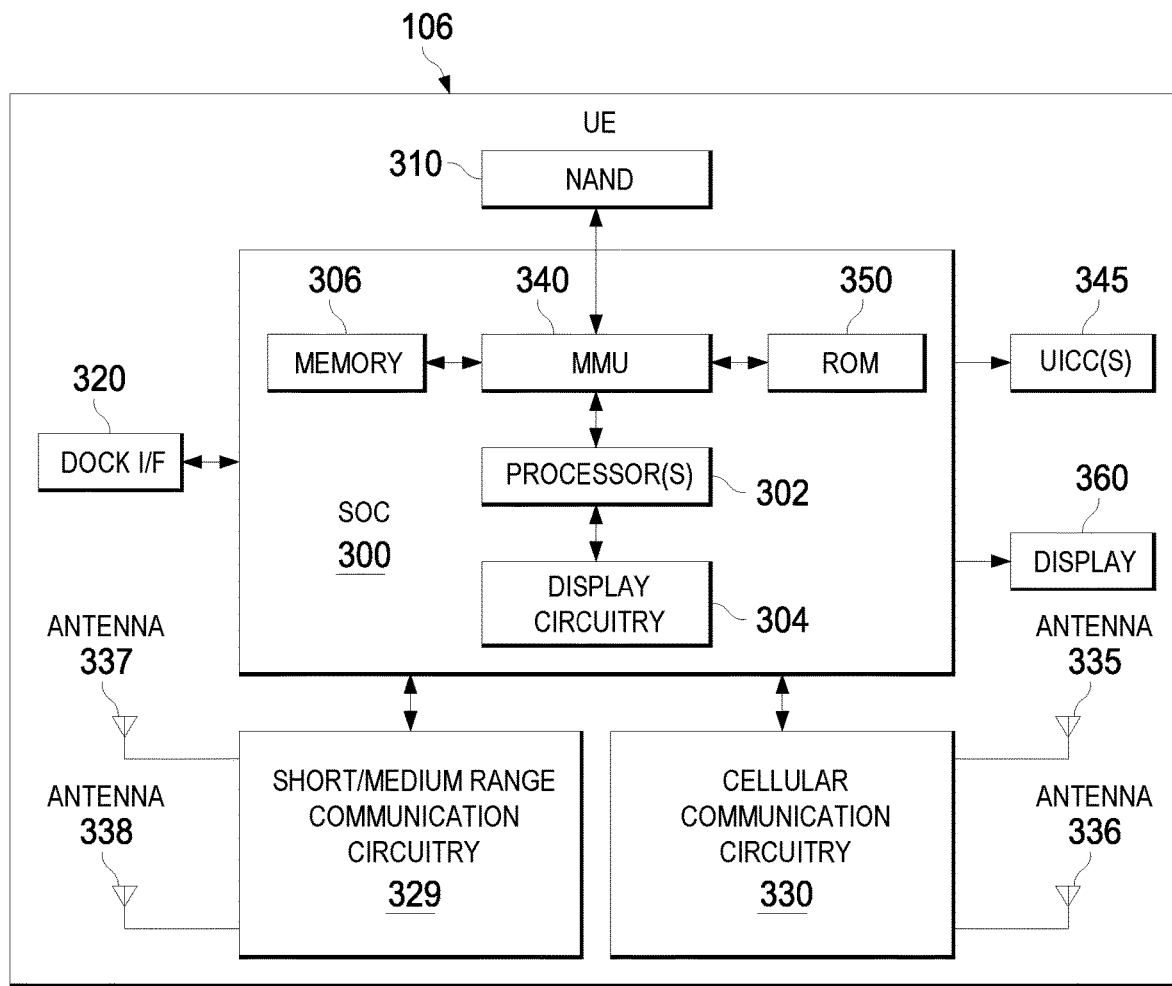
FIG. 3 illustrates an example simplified block diagram of a wireless device.

FIG. 3 illustrates an example simplified block diagram of a wireless device 106. It is noted that the block diagram of the wireless device 106 of FIG. 3 is only one example of a possible wireless device. According to some implementations, wireless device 106 can be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the wireless device 106 can include a set of components 300 configured to perform core functions. For example, this set of components can be implemented as a system on chip (SOC), which can include portions for various purposes. Alternatively, this set of components 300 can be implemented as separate components or groups of components for the various purposes. The set of components 300 can be coupled (e.g., communicatively; directly or indirectly) to various other circuits of the wireless device 106.

For example, the wireless device 106 can include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.,), the display 360, which can be integrated with or external to the wireless device 106, and cellular communication circuitry 330 such as for 5G NR, LTE, GSM, etc., and short to medium range wireless communication circuitry 329 (e.g., Bluetooth™ and WLAN circuitry). In some implementations, the wireless device 106 can include wired communication circuitry (not shown), such as a network interface card, e.g., for Ethernet.

The cellular communication circuitry 330 can couple (e.g., communicatively; directly or indirectly) to one or more antennas, such as antennas 335 and 336 as shown. The short to medium range wireless communication circuitry 329 can also couple (e.g., communicatively; directly or indirectly) to one or more antennas, such as antennas 337 and 338 as shown. Alternatively, the short to medium range wireless communication circuitry 329 can couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 can include multiple receive chains and/or multiple transmit chains for receiving and/or transmitting multiple spatial streams, such as in a multiple-input multiple output (MIMO) configuration.

In some implementations, as further described below, cellular communication circuitry 330 can include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some implementations, cellular communication circuitry 330 can include a single transmit chain that can be switched between radios dedicated to specific RATs. For example, a first radio can be dedicated to a first RAT, e.g., LTE, and can be in communication with a dedicated receive chain and a transmit chain shared with an additional radio, e.g., a second radio that can be dedicated to a second RAT, e.g., 5G NR, and can be in communication with a dedicated receive chain and the shared transmit chain.

The wireless device 106 can also include and/or be configured for use with one or more user interface elements. The user interface elements can include any of various elements, such as display 360 (which can be a touchscreen display), a keyboard (which can be a discrete keyboard or can be implemented as part of a touchscreen display), a mouse, a microphone and/or speakers, one or more cameras, one or more buttons, and/or any of various other elements capable of providing information to a user and/or receiving or interpreting user input.

The wireless device 106 can further include one or more smart cards 345 that include subscriber identity module (SIM) functionality, such as one or more universal integrated circuit cards (UICCs) 345.

As shown, the SOC 300 can include processor(s) 302, which can execute program instructions for the wireless device 106 and display circuitry 304, which can perform graphics processing and provide display signals to the display 360. The processor(s) 302 can also be coupled to memory management unit (MMU) 340, which can be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 can be configured to perform memory protection and page table translation or set up. In some implementations, the MMU 340 can be included as a portion of the processor(s) 302.

As noted above, the wireless device 106 can be configured to communicate using wireless and/or wired communication circuitry. The wireless device 106 can be configured to transmit a request to attach to a first network node operating according to the first radio access technology (RAT) and transmit an indication that the wireless device 106 is capable of maintaining substantially concurrent connections with the first network node and a second network node that operates according to the second RAT. The wireless device 106 can also be configured transmit a request to attach to the second network node. The request can include an indication that the wireless device 106 is capable of maintaining substantially concurrent connections with the first and second network nodes. Further, the wireless device 106 can be configured to receive an indication that dual connectivity with the first and second network nodes has been established.

As described herein, the wireless device 106 can include hardware and software components for implementing the above features for time division multiplexing UL data for NSA NR operations. The processor 302 of the wireless device 106 can be configured to implement part or all of the features described herein, e.g., by executing program instructions stored on a memory medium (e.g., a non-transitory computer-readable memory medium). Alternatively (or in addition), processor 302 can be configured as a programmable hardware element, such as a Field Programmable Gate Array (FPGA), or as an Application Specific Integrated Circuit (ASIC). Alternatively (or in addition) the processor 302 of the wireless device 106, in conjunction with one or more of the other components 300, 304, 306, 310, 320, 329, 330, 340, 345, 350, 360 can be configured to implement part or all of the features described herein.

In addition, as described herein, processor 302 can include one or more processing elements. Thus, processor 302 can include one or more integrated circuits (ICs) that are configured to perform the functions of processor 302. In addition, each integrated circuit can include circuitry (e.g., first circuitry, second circuitry, etc.) configured to perform the functions of processor(s) 302.

Further, as described herein, cellular communication circuitry 330 and short range wireless communication circuitry 329 can each include one or more processing elements. In other words, one or more processing elements can be included in cellular communication circuitry 330 and, similarly, one or more processing elements can be included in short range wireless communication circuitry 329. Thus, cellular communication circuitry 330 can include one or more integrated circuits (ICs) that are configured to perform the functions of cellular communication circuitry 330. In addition, each integrated circuit can include circuitry (e.g., first circuitry, second circuitry, etc.) configured to perform the functions of cellular communication circuitry 230. Similarly, the short range wireless communication circuitry 329 can include one or more ICs that are configured to perform the functions of short range wireless communication circuitry 32. In addition, each integrated circuit can include circuitry (e.g., first circuitry, second circuitry, etc.) configured to perform the functions of short range wireless communication circuitry 329.

Figure 4:
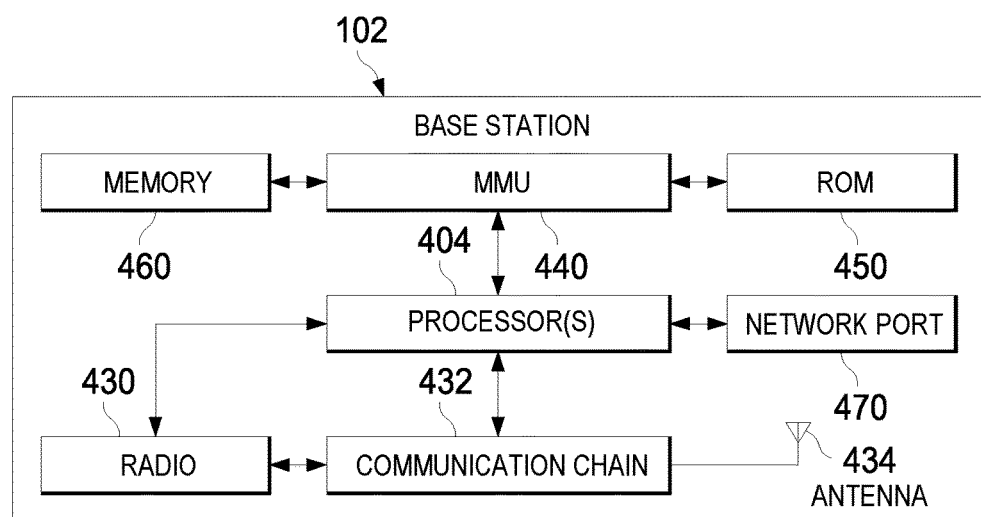
FIG. 4 illustrates an example block diagram of a BS.

FIG. 4 illustrates an example block diagram of a base station 102. It is noted that the base station of FIG. 4 is merely one example of a possible base station. As shown, the base station 102 can include processor(s) 404 which can execute program instructions for the base station 102. The processor(s) 404 can also be coupled to memory management unit (MMU) 440, which can be configured to receive addresses from the processor(s) 404 and translate those addresses to locations in memory (e.g., memory 460 and read only memory (ROM) 450) or to other circuits or devices.

The base station 102 can include at least one network port 470. The network port 470 can be configured to couple to a telephone network and provide multiple devices, such as UE devices 106, access to the telephone network as described above in FIGS. 1 and 2.

The network port 470 (or an additional network port) can also or alternatively be configured to couple to a cellular network, e.g., a core network of a cellular service provider. The core network can provide mobility related services and/or other services to a plurality of devices, such as UE devices 106. In some cases, the network port 470 can couple to a telephone network via the core network, and/or the core network can provide a telephone network (e.g., among other UE devices serviced by the cellular service provider).

In some implementations, base station 102 can be a next generation base station, e.g., a 5G New Radio (5G NR) base station, or "gNB." In such implementations, base station 102 can be connected to a legacy evolved packet core (EPC) network and/or to a NR core (NRC) network. In addition, base station 102 can be considered a 5G NR cell and can include one or more transition and reception points (TRPs). In addition, a UE capable of operating according to 5G NR can be connected to one or more TRPs within one or more gNBs.

The base station 102 can include at least one antenna 434, and possibly multiple antennas. The at least one antenna 434 can be configured to operate as a wireless transceiver and can be further configured to communicate with UE devices 106 via radio 430. The antenna 434 communicates with the radio 430 via communication chain 432. Communication chain 432 can be a receive chain, a transmit chain or both. The radio 430 can be configured to communicate via various wireless communication standards, including, but not limited to, 5G NR, LTE, LTE-A, GSM, UMTS, CDMA2000, Wi-Fi, etc.

The base station 102 can be configured to communicate wirelessly using multiple wireless communication standards. In some instances, the base station 102 can include multiple radios, which can enable the base station 102 to communicate according to multiple wireless communication technologies. For example, as one possibility, the base station 102 can include an LTE radio for performing communication according to LTE as well as a 5G NR radio for performing communication according to 5G NR. In such a case, the base station 102 can be capable of operating as both an LTE base station and a 5G NR base station. As another possibility, the base station 102 can include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 can include hardware and software components for implementing or supporting implementation of features described herein. The processor 404 of the base station 102 can be configured to implement or support implementation of part or all of the methods described herein, e.g., by executing program instructions stored on a memory medium (e.g., a non-transitory computer-readable memory medium). Alternatively, the processor 404 can be configured as a programmable hardware element, such as a Field Programmable Gate Array (FPGA), or as an Application Specific Integrated Circuit (ASIC), or a combination thereof. Alternatively (or in addition) the processor 404 of the BS 102, in conjunction with one or more of the other components 430, 432, 434, 440, 450, 460, 470 can be configured to implement or support implementation of part or all of the features described herein.

In addition, as described herein, processor(s) 404 can be comprised of one or more processing elements. In other words, one or more processing elements can be included in processor(s) 404. Thus, processor(s) 404 can include one or more integrated circuits (ICs) that are configured to perform the functions of processor(s) 404. In addition, each integrated circuit can include circuitry (e.g., first circuitry, second circuitry, etc.) configured to perform the functions of processor(s) 404.

Further, as described herein, radio 430 can be comprised of one or more processing elements. In other words, one or more processing elements can be included in radio 430. Thus, radio 430 can include one or more integrated circuits (ICs) that are configured to perform the functions of radio 430. In addition, each integrated circuit can include circuitry (e.g., first circuitry, second circuitry, etc.) configured to perform the functions of radio 430.

Figure 5:
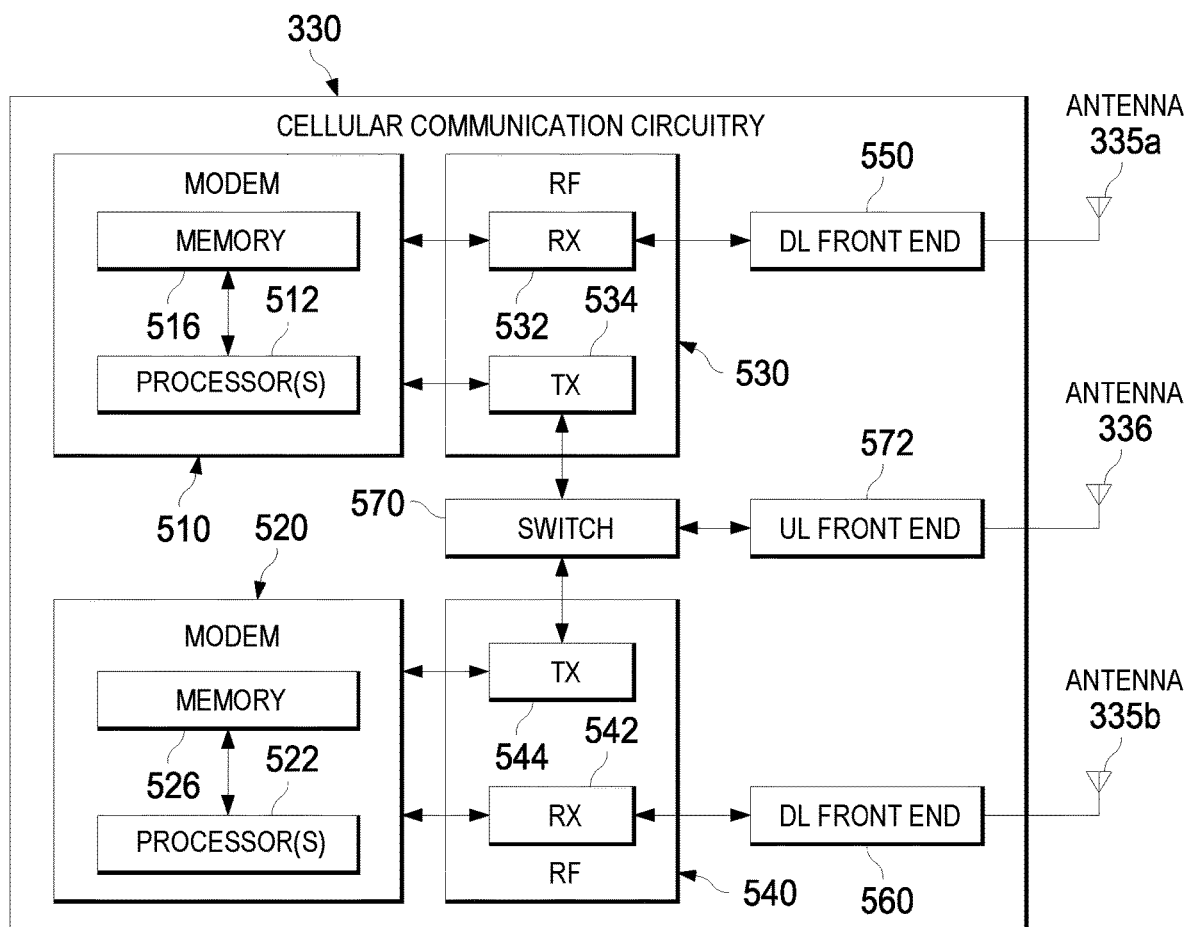
FIG. 5 illustrates an example block diagram of cellular communication circuitry.

FIG. 5 illustrates an example block diagram of cellular communication circuitry. It is noted that the block diagram of the cellular communication circuitry of FIG. 5 is only one example of a possible cellular communication circuit. According to some implementations, cellular communication circuitry 330 can be include in a wireless device, such as wireless device 106 described above. As noted above, wireless device 106 can be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 can couple (e.g., communicatively; directly or indirectly) to one or more antennas, such as antennas 335a-b and 336 as shown in FIG. 3. In some implementations, cellular communication circuitry 330 can include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 can include a modem 510 and a modem 520. Modem 510 can be configured for communications according to a first RAT, e.g., such as LTE or LTE-A, and modem 520 can be configured for communications according to a second RAT, e.g., such as 5GNR.

As shown, modem 510 can include one or more processors 512 and a memory 516 in communication with processors 512. Modem 510 can be in communication with a radio frequency (RF) front end 530. RF front end 530 can include circuitry for transmitting and receiving radio signals. For example, RF front end 530 can include receive circuitry (RX) 532 and transmit circuitry (TX) 534. In some implementations, receive circuitry 532 can be in communication with downlink (DL) front end 550, which can include circuitry for receiving radio signals via antenna 335a.

Similarly, modem 520 can include one or more processors 522 and a memory 526 in communication with processors 522. Modem 520 can be in communication with an RF front end 540. RF front end 540 can include circuitry for transmitting and receiving radio signals. For example, RF front end 540 can include receive circuitry 542 and transmit circuitry 544. In some implementations, receive circuitry 542 can be in communication with DL front end 560, which can include circuitry for receiving radio signals via antenna 335b.

In some implementations, a switch 570 can couple transmit circuitry 534 to uplink (UL) front end 572. In addition, switch 570 can couple transmit circuitry 544 to UL front end 572. UL front end 572 can include circuitry for transmitting radio signals via antenna 336. Thus, when cellular communication circuitry 330 receives instructions to transmit according to the first RAT (e.g., as supported via modem 510), switch 570 can be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 can be switched to a second state that allows modem 520 to transmit signals according to the second RAT (e.g., via a transmit chain that includes transmit circuitry 544 and UL front end 572).

In some implementations, the cellular communication circuitry 330 can be configured to establish a first wireless link with a first cell according to a first radio access technology (RAT), wherein the first cell operates in a first system bandwidth and establish a second wireless link with a second cell according to a second radio access technology (RAT), wherein the second cell operates in a second system bandwidth. Further, the cellular communication circuitry 330 can be configured to determine whether the cellular communication circuitry 330 has uplink activity scheduled according to both the first RAT and the second RAT and perform uplink activity for both the first RAT and the second RAT by time division multiplexing (TDM) uplink data for the first RAT and uplink data for the second RAT if uplink activity is scheduled according to both the first RAT and the second RAT. In some implementations, to perform uplink activity for both the first RAT and the second RAT by time division multiplexing (TDM) uplink data for the first RAT and uplink data for the second RAT if uplink activity is scheduled according to both the first RAT and the second RAT, the cellular communication circuitry 330 can be configured to receive an allocation of a first UL subframe for transmissions according to the first RAT and an allocation of a second UL subframe for transmissions according to the second RAT. In some implementations, the TDM of the uplink data can be performed at a physical layer of the cellular communication circuitry 330. In some implementations, the cellular communication circuitry 330 can be further configured to receive an allocation of a portion of each UL subframe for control signaling according to one of the first or second RATs.

As described herein, the modem 510 can include hardware and software components for implementing the above features or for time division multiplexing UL data for NSA NR operations, as well as the various other techniques described herein. The processors 512 can be configured to implement part or all of the features described herein, e.g., by executing program instructions stored on a memory medium (e.g., a non-transitory computer-readable memory medium). Alternatively (or in addition), processor 512 can be configured as a programmable hardware element, such as a Field Programmable Gate Array (FPGA), or as an Application Specific Integrated Circuit (ASIC). Alternatively (or in addition) the processor 512, in conjunction with one or more of the other components 530, 532, 534, 550, 570, 572, 335 and 336 can be configured to implement part or all of the features described herein.

In addition, as described herein, processors 512 can include one or more processing elements. Thus, processors 512 can include one or more integrated circuits (ICs) that are configured to perform the functions of processors 512. In addition, each integrated circuit can include circuitry (e.g., first circuitry, second circuitry, etc.) configured to perform the functions of processors 512.

As described herein, the modem 520 can include hardware and software components for implementing the above features for time division multiplexing UL data for NSA NR operations, as well as the various other techniques described herein. The processors 522 can be configured to implement part or all of the features described herein, e.g., by executing program instructions stored on a memory medium (e.g., a non-transitory computer-readable memory medium). Alternatively (or in addition), processor 522 can be configured as a programmable hardware element, such as a Field Programmable Gate Array (FPGA), or as an Application Specific Integrated Circuit (ASIC). Alternatively (or in addition) the processor 522, in conjunction with one or more of the other components 540, 542, 544, 550, 570, 572, 335 and 336 can be configured to implement part or all of the features described herein.

In addition, as described herein, processors 522 can include one or more processing elements. Thus, processors 522 can include one or more integrated circuits (ICs) that are configured to perform the functions of processors 522. In addition, each integrated circuit can include circuitry (e.g., first circuitry, second circuitry, etc.) configured to perform the functions of processors 522.

FIG. 6 illustrates enhancements to downlink control information (DCI) for a reduced-complexity NR wireless device. In some implementations, the UE 106 (illustrated and described in more detail with reference to FIGS. 1 and 2) is a reduced-complexity NR wireless device. Such a reduced-complexity NR wireless device typically has reduced cost and complexity as compared to higher-end enhanced mobile broadband (eMBB) devices and ultra-reliable low-latency communication (URLLC) devices. For example, a wireless industrial sensor device can be a reduced-complexity NR wireless device. In some implementations, the reduced-complexity UE 106 has a more compact form factor. The UE 106 supports the frequency range 1 (FR1) and frequency range 2 (FR2) bands for frequency division duplexing (FDD) and time division duplexing (TDD). FR1 includes the sub-6 gigahertz (GHz) spectrum, but has also been extended to cover spectrum offerings from 410 megahertz (MHz) to 7125 MHz. FR2 includes frequency bands from 24.25 GHz to 52.6 GHz.

In some implementations, the reduced-complexity UE 106 includes one or more processors 302, illustrated and described in more detail with reference to FIG. 3. The processors 302 are configured to transmit a type of the UE 106 to the base station 102 that is communicatively coupled to the UE 106. The base station 102 is illustrated and described in more detail with reference to FIGS. 1 and 4. In some implementations, the type of the UE 106 is expressed in terms of a target reliability requirement, a target communication latency requirement, a target uplink (UL) and downlink (DL) communication bitrate, a target reduction in design complexity, a target form factor target, or a target supported bandwidth. UL and DL are illustrated and described in more detail with reference to FIG. 5. In some implementations, the type of the UE 106 is an industrial sensor device having an end-to-end communication latency less than 100 milliseconds (ms) and a communication bitrate less than 2 megabits per second (Mbps). For example, the UE 106 can be an industrial wireless sensor having a communication service availability level of 99.99% and a reference bitrate less than 2 Mbps (e.g., potentially asymmetric UL-heavy traffic). The UE 106 can be stationary and can have a battery that lasts one or more years. If the UE 106 is a safety-related sensor, the communication latency requirement can be 5-10 ms.

In some implementations, the type of the UE 106 is a video surveillance device having a communication latency less than 500 ms and a communication bitrate in a range from 2 to 25 Mbps. For example, the UE 106 can have a reference economic video bitrate in a range from 2 4 Mbps, a communication latency less than 500 ms, and a reliability level of 99%-99.9%. A higher-end video surveillance device, for example, for farming can have a communication bitrate of 7.5-25 Mbps with a traffic pattern dominated by UL transmissions. In some implementations, the type of the UE 106 is a wearable device having a communication bitrate in a range from 5 to 150 Mbps. For example, for a smart wearable application, the UE 106 can have a reference bitrate of 10-50 Mbps for DL and a minimum bitrate of 5 Mbps for UL. The peak communication bitrate can be 150 Mbps for DL and 50 Mbps for UL. The battery of such a wearable device can last from multiple days to 1-2 weeks. In some implementations, the UE 106 has a reduced number of RX/TX antennas and a reduced bandwidth compared to traditional devices. The UE 106 can perform half-duplex-FDD. The UE 106 can have a relaxed processing time and a relaxed processing capability compared to traditional devices. The UE 106 is sometimes referred to as an "NR Light UE."

The UE 106 receives a format of the DCI from the base station 102. The DCI provides the UE 106 with information, such as physical layer resource allocation, power control commands, and hybrid automatic repeat request (HARQ) information for UL or DL. The HARQ information is a combination of high-rate forward error-correcting coding and ARQ error-control. The DCI includes multiple bit strings indicating a schedule of a physical downlink shared channel (PDSCH) or a physical uplink shared channel (PUSCH). The format specifies a respective number of bits for each bit string, as shown in FIG. 6. The format illustrated in FIG. 6 is defined by the base station 102 based on the type of the UE 106. Because the UE 106 is a reduced-complexity device having less processing power and resources, the DCI format is designed to avoid impacting the physical downlink control channel (PDCCH) detection performance of the UE 106. For example, the UE 106 can have only one reception antenna because of small device form factor limitation. With the complexity reduction in the UE 106, traditional DCI formats are not be fully reusable. For example, as shown in FIG. 6, certain fields (bit strings) in the DCI are not applicable for reduced-complexity devices. The base station 102 can remove such bit strings to reduce a bit size of the DCI format, such that the PDCCH detection performance improves.

The UE 106 receives the DCI from the base station 102 using the PDCCH. The UE 106 extracts the multiple bit strings from the DCI based on the format of the DCI. The UE 106 determines the schedule of the PDSCH or the PUSCH from the multiple bit strings. The base station 102 uses enhanced UL and DL DCI formats for the reduced-complexity NR UE 106. The UE 106 monitors the enhanced DCI formats, sometimes referred to as DCI format 0_3 and DCI format 1_3. The DCI format 1_3 is illustrated in FIG. 6. The UE 106 monitors the traditional DCI formats 0_0 and 1_0, sometimes referred to as "fallback DCIs."

In the enhanced uplink DCI format illustrated in FIG. 6, the fields (bit strings) of the URLLC DCI formats 0_2 and 1_2 can be used to define the enhanced DCI format by modifying the respective number of bits for some bit strings. Such an implementation is especially beneficial for multi-user multiple-input multiple-output (MU MIMO) transmission. In some implementations as shown in FIG. 6, the bit strings of the traditional DCI formats 0_0 and 1_0 are used to define the enhanced DCI format by modifying the respective number of bits for some bit strings. In such implementations, an improved PDCCH performance is achieved with a reduced number of bits. In other implementations, the respective number of bits in some bit strings is configurable by the base station 102 in accordance with the type of the UE 106 reported by the UE 106.

In some implementations shown in FIG. 6, the multiple bit strings in the DCI include a particular bit string having a particular number of bits. The particular bit string indicates a modulation and coding scheme (MCS) specified by the base station 102. The MCS is used in the physical layer of the 5G NR system. The particular number of bits is based on radio resource control (RRC) signaling performed by the UE 106. For example, the MCS field can be reduced from 5 bits (in traditional DCI formats) to 4 bits in an enhanced DCI format. If the particular number of bits is 4, the DCI will support 16-quadrature amplitude modulation (16-QAM). QAM is a digital modulation method used by the UE 106 and base station 102. The base station 102 configures the particular number of bits based on RRC signaling. For example, the RRC signaling specifies the lowest MCS entry and the particular number of bit of the MCS bit string. As shown in FIG. 6, the MCS bit string in the DCI indicates which MCS entry is applied.

In some implementations shown in FIG. 6, the multiple bit strings in the DCI include a particular bit string having a particular number of bits. The particular bit string indicates a number of hybrid automatic repeat request (HARQ) processes specified by the base station 102. HARQ refers to a combination of high-rate forward error-correcting coding and ARQ error-control. A communication latency of the UE 106 is an increasing function of the particular number of bits. Thus, as the particular number of bits decreases, the communication latency of the UE 106 typically decreases. As shown in FIG. 6, the particular number of bits of the particular bit string representing the number of HARQ processes is configurable, for example, 2, 3, or 4 bits, corresponding to 4, 8, or 16 HARQ processes.

In some implementations shown in FIG. 6, the multiple bit strings in the DCI include a particular bit string indicating a number of repetitions of the PDSCH or the PUSCH specified by the base station 102. A communication latency of the wireless device is an increasing function of the particular number of bits because retransmission of data is reduced. The particular bit string has a particular number of bits, for example, 0, 2, or 3 bits indicating the number of repetitions of the PDSCH or the PUSCH dynamically. In some implementations, the number of repetitions of the PDSCH or the PUSCH are extended beyond traditional methods, for example, to 2, 4, 8, or 16 repetitions using 2 bits in the particular bit string, and 4, 8, 12, 16, 20, 24, 28, or 32 repetitions using 3 bits in the particular bit string. When the particular number of bits is 0, repetition is not configured by the RRC signaling.

Referring to FIG. 6, the identifier for DCI formats indicates whether the DCI is for UL or DL. If the UL and DL DCIs have a different payload size, the base station 102 can omit this particular bit string from the DCI. The bit string named differentiation of DCI differentiates between the fallback DCI format 1_0 and the NR Light DCI format 1_3 if both DCI formats have the same size. The bit string FDRA denotes that for the NR Light UE 106, the scheduling granularity is configured (1, 2, 4, or 8). This is applicable for both the starting point and a length indication for resource allocation type 1. In downlink resource allocation type 1, the resource block assignment information indicates, to a scheduled UE 106, a set of contiguously allocated resource non-interleaved or interleaved virtual blocks within the active bandwidth part. A downlink type 1 resource allocation field consists of a resource indication value (RIV) corresponding to a starting virtual resource block and a length in terms of contiguously allocated resource blocks. The bit string TDRA reuses this field from the existing DCI format 1_1. For the NR Light UE 106, the latency requirement is not tightened and slot level scheduling is used. The particular number of bits in the bit string "virtual resource block (VRB) to physical resource block (PRB) mapping" can be 0 or 1. If the bit string has 0 bits, non-interleaved VRB-to-PRB mapping is used, as in 3GPP Release 15. The bit string MCS has a reduced particular number of bits compared to traditional DCIs. Some values, such as 64-QAM, are typically not used for NR Light. Therefore, the particular number of bits can be reduced. For a stationary UE 106, the particular number of bit is configurable.

Continuing with the example of FIG. 6, the bit string named new data indicator (NDI) is used as in 3GPP Release 15. The base station 102 can configure the particular number of bits in the particular bit string named redundancy version (RV) to 0, 1, or 2 bits. If 0 bits are configured, RV0 is used. If 1 bit is configured, RV0 and RV3 are indicated dynamically. The particular number of bits in the bit string HARQ Process Number is configurable to 2, 3, or 4. A reduced number of HARQ processes can reduce the required buffer, but does not tighten the processing time for the UE 106. The bit string named downlink assignment index (DAI) is communicated to the UE 106 by the base station 102 to prevent ACK/NACK reporting errors. A two-bit DAI can be applied as a counter DAI. The bit string transmit power control (TPC) for physical uplink control channel (PUCCH) is configured as in the 3GPP Release 15. The bit string PUCCH Resource Indicator is configured as in the 3GPP Release 15. The bit string PDSCH-to-HARQ Feedback is configured as in DCI format 1_1, counting at the slot boundary. The bit string PDSCH Repetition Number indicates the number of PDSCH repetitions, as described in more detail previously. The bit string DCI Repetition Number indicates a number of DCI repetitions and improves the PDCCH decoding performance, as described in more detail previously.

FIG. 7 illustrates enhancements to DCI for a reduced-complexity NR device UE 106. The bit strings shown in FIG. 7 are applicable to the non-back DCI, URLLC DCI, and NR Light DCI, i.e., DCI formats 1_1, 1_2, and 1_2. In some implementations, the frequency domain resource assignment supports only limited bandwidths, such as the 5 MHz bandwidth and 20 MHz bandwidth. The scheduling granularity indicated by the enhanced DCI can indicate 2, 4, or 8 physical resource blocks (PRBs). In 5G NR, resource elements are grouped into PRBs. Each PRB includes 12 subcarriers. In some implementations, carrier aggregation is not supported, and only a single transport block (TB) transmission is supported. In some implementations, the bit string denoting the VRB-to-PRB mapping can be 0 or 1 bits long, and can be configured by RRC signaling. If the VRB-to-PRB mapping is not configured by the DCI, a distributed mapping is used. As shown in FIG. 7, cross bandwidth part (BWP) scheduling is not supported in some implementations. The BWP feature enables more flexibility in how resources are assigned in a given carrier. The bit strings denoting MIMO features, such as antenna port, SRS request, TCI, and DM-RS sequence initialization can have 0 bits or a full value range provided by the 3GPP Release 15 non-fallback DCI.

Referring to FIG. 7, the bit string Carrier Indicator is not used for the NR Light UE 106. The bit string BWP Indicator supports one BP due to a more limited bandwidth. In some implementations, dynamic changes in BWP are not supported. The bit string PRB Bundling Size Indicator can have 0 or 1 bits. The bit string Rate Matching Indicator can have 0, 1, or 2 bits. The bit string ZP CSI-RS Trigger refers to a type of reference signal to be used. The bit string can have 0, 1, or 2 bits. The bit string Antenna Port(s) is a new RRC configuration parameter introduced for reduced-complexity devices. The bit string Transmission Configuration Indication can have 0, 1, 2, or 3 bits. The bit string sounding reference signal (SRS) request can have 0, 1, 2, or 3 bits. The SRS is a reference signal for the base station 102 to determine a channel quality of the uplink path for each subsection of a frequency region. The bit string demodulation reference signal (DMRS) sequence can have 0 or 1 bits. The PUSCH DMRS refers to the uplink user's shared channel DMRS and is transmitted in each resource block allocated to the user. The remaining DCI fields are not used for the NR Light UE 106, as shown in FIG. 7.

FIG. 8 illustrates enhancements to an uplink DCI for a reduced-complexity NR device. In some implementations, the multiple bit strings of the DCI include a particular bit string having a particular number of bits. The particular bit string indicates a number of repetitions of the DCI specified by the base station 102. A rate of extracting the multiple bit strings from the DCI increases as the number of repetitions increases. As shown in FIG. 8, the bit string named DCI Repetition Number can have 0 or 2 bits. The bit string results in improved DCI decoding performance by the UE 106. When the particular number of bits is 0, the DCI repetition is not configured by the RRC signaling.

In some implementations as shown in FIG. 8, the DCI format size for NR Light is the same as the size of the fallback DCI formats 0_0 and 1_0. The bit string fields of the DCI formats 0_0 and 1_0 are used to generate the enhanced DCI format having configurable numbers of bits for the UE 106. If the enhanced DCI format size is smaller than the size of the fallback DCIs, additional field(s) can be introduced into the enhanced DCI. The selection of the additional bit strings is configured by RRC signaling. For example, the additional bit strings can be SRS Request or VRB-to-PRB mapping in the UL DCI. In some implementations as shown in FIG. 8, a single bit is used to differentiate between the fallback DCI and the enhanced DCI. The differentiation bit can be applied to the fallback DCI in both the common search space (CSS) and the UE-specific search space (USS). In some implementations, the differentiation bit is applied to the fallback DCI in only the USS. To align the size of the fallback DCI in the CSS and USS, the differentiation bit can be borrowed from another bit string field. For example, the scheduling granularity can be configured using 2, 4, or 8 PRBs. Hence, at least one bit is unused by the TDRA bit string or one bit can be reserved from the MCS bit string field.

Referring to FIG. 8, the bit string "Differentiation of DCI" differentiates between the fallback DCI and the NR Light DCI, that is, between formats 0_0 and 0_3. In some implementations, the multiple bit strings include a particular bit string indicating a frequency domain resource allocation (FDRA) specified by the base station. The bit string FDRA is used to configure the scheduling granularity applicable for both the starting point and the length indication for resource allocation type 1 as in the DCI format 0_2. The bit string TDRA reuses the DCI format 0_1. When the UE 106 is a URLLC, the maximum TDRA table size is increased to 64. The bit string Frequency Hopping Flag is configured as in the 3GPP Release 15 DCI format 0_1. For the bit string MCS, some entries (such as 64-QAM) are typically not used for the NR Light UE 106. Hence, the number of bits can be reduced. For a stationary UE 106, the number of bits used is configurable by the station 102. The bit string RV can have 0, 1, or 2 bits. The number of bits is 0, RV0 is used. If the number of bits is 1, RV0 and RV3 are indicated dynamically. The bit string HARQ Process Number can have 2, 3, or 4 bits. A reduced number of HARQ processes can reduce the required buffer. The bit string TPC for PUSCH is configured as in the 3GPP Release 15 DCI formats 0_0 and 0_1. The bit string UL/SUL Indicator is configured as in the 3GPP Release 15. The bit string PUSCH Repetition indicates the number of PUSCH repetitions dynamically.

FIG. 9 illustrates enhancements to DCI for a reduced-complexity NR device. In some implementations, the format of the DCI includes a cyclic redundancy check (CRC) encoded using a radio network temporary identifier (RNTI) assigned by the base station. A CRC refers to an error-detecting code to detect changes to data. For example, the data entering the UE 106 can get a check value attached based on the remainder of a polynomial division of the contents. An RNTI can be used to differentiate between or identify a connected wireless device in a cell, a specific radio channel, a group of wireless device in case of paging, or a group of wireless devices for which power control is issued by the base station 102. In some implementations the base station 102 uses the RNTI in the enhanced DCI to identity the UE 106. To differentiate between the fallback DCI and the enhanced DCI for the NR Light UE 106, a new RNTI, such as reduced-complexity RNTI (RC RNTI) can be used.

Referring to FIG. 9, the bit strings Carrier Indicator and BWP Indicator are omitted from the enhanced DCI. The bit string VRB-to-PRB mapping can have 0 or 1 bits. The bit string $1^{st}$ DAI can have 1 or 2 bits (1 bit for semi-static HARQ-ACK codebook, 2 bits for dynamic HARQ-ACK codebook). The bit string $2^{nd}$ DAI can have 0 or 2 bits (2 bits for dynamic HARQ-ACK codebook, 0 bits otherwise). The bit string SRS resource indicator can have 0, 1, 2, 3, or 4 bits. The bit string Precoding Info & # of Layers has a configurable number of bits. MIMO related fields can be disabled by setting the number of bits to 0.

FIG. 10 illustrates a process of operation using enhanced DCI for a reduced-complexity NR device. In some implementations, the process of FIG. 10 is performed by the UE 106, illustrated and described in more detail with reference to FIGS. 1 and 3. In other implementations, The UE 106 transmits (1004) a type of the UE 106 to the base station 102 that is communicatively coupled to the UE 106. In some implementations, the type of the UE 106 is expressed in terms of a target reliability requirement, a target communication latency requirement, a target uplink (UL) and downlink (DL) communication bitrate, a target reduction in design complexity, a target form factor target, or a target supported bandwidth.

The UE 106 receives (1008) a format of the DCI from the base station 102. The DCI includes multiple bit strings indicating a schedule of a physical downlink shared channel (PDSCH) or a physical uplink shared channel (PUSCH). The format specifies a respective number of bits for each bit string. The format is defined by the base station 102 based on the type of the UE 106.

The UE 106 receives (1012) the DCI from the base station 102 using a physical downlink control channel (PDCCH). The DCI provides the UE 106 with information, such as physical layer resource allocation, power control commands, and hybrid automatic repeat request (HARQ) information for UL or DL. The HARQ information is a combination of high-rate forward error-correcting coding and ARQ error-control.

The UE 106 extracts (1016) the multiple bit strings from the DCI based on the format of the DCI. In some implementations as shown in FIG. 8, the DCI format size for NR Light is the same as the size of the fallback DCI formats 0_0 and 1_0. The bit string fields of the DCI formats 0_0 and 1_0 are used to generate the enhanced DCI format having configurable numbers of bits for the UE 106. If the enhanced DCI format size is smaller than the size of the fallback DCIs, additional field(s) can be introduced into the enhanced DCI. The selection of the additional bit strings is configured by RRC signaling. For example, the additional bit strings can be SRS Request or VRB-to-PRB mapping in the UL DCI.

The UE 106 determines (1020) the schedule of the PDSCH or the PUSCH from the multiple bit strings. In some implementations, the frequency domain resource assignment supports only limited bandwidths, such as the 5 MHz bandwidth and 20 MHz bandwidth. The scheduling granularity indicated by the enhanced DCI can indicate 2, 4, or 8 physical resource blocks (PRBs). In 5G NR, resource elements are grouped into PRBs. Each PRB includes 12 subcarriers. In some implementations, carrier aggregation is not supported, and only a single transport block (TB) transmission is supported.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

In the foregoing description, implementations of the invention have been described with reference to numerous specific details that may vary from implementation to implementation. The description and drawings are, accordingly, to be regarded in an illustrative rather than a restrictive sense. Any definitions expressly set forth herein for terms contained in such claims shall govern the meaning of such terms as used in the claims.

What is claimed is:

1. A reduced-complexity wireless device configured to operate in a wireless network compliant with a New Radio (NR) radio telecommunications protocol, the reduced-complexity wireless device comprising:
one or more processors configured to:
transmit a type of the reduced-complexity wireless device to a base station communicatively coupled to the wireless device;
receive downlink control information (DCI) from the base station using a physical downlink control channel (PDCCH), the DCI comprising a DCI format differentiation bit string comprising a bit indicating a DCI format of one of a reduced-complexity DCI format or a fallback DCI format, the DCI comprising an indication of a schedule of a physical downlink shared channel (PDSCH) or a physical uplink shared channel (PUSCH);
decode the DCI based on the DCI format determined from the DCI format differentiation bit string; and
communicate on the PDSCH or the PUSCH based on the decoded DCI.

2. The wireless device of claim 1, wherein the type of the wireless device is at least one of:
an industrial sensor device having a communication latency less than 150 milliseconds (ms) and a communication bitrate less than 3 megabits per second (Mbps);
a video surveillance device having a communication latency less than 750 ms and a communication bitrate in a range from 1.5 to 30 Mbps; or
a wearable device having a communication bitrate in a range from 4 to 200 Mbps.

3. The wireless device of claim 1, wherein the DCI comprises a bit string indicating a number of repetitions of the DCI specified by the base station, wherein a rate of extracting bit strings from the DCI increases as the number of repetitions of the DCI increases.

4. The wireless device of claim 1, wherein DCI comprises a bit string indicating a frequency domain resource allocation (FDRA) specified by the base station, the FDRA comprising a configurable bit string comprising one of 1, 2, 4, or 8 bits, the FDRA indicating a scheduling granularity for a starting point and a length indication for resource allocation.

5. A non-transitory computer-readable storage medium storing computer instructions, which when executed by one or more computer processors, cause the one or more computer processors to:
transmit a type of a wireless device to a base station communicatively coupled to the wireless device;
receive downlink control information (DCI) from the base station using a physical downlink control channel (PDCCH), the DCI comprising a DCI format differentiation bit string comprising a bit indicating a DCI format of one of a reduced-complexity DCI format or a fallback DCI format, the DCI comprising an indication of a schedule of a physical downlink shared channel (PDSCH) or a physical uplink shared channel (PUSCH);
decode the DCI based on the DCI format determined from the DCI format differentiation bit string; and
communicate on the PDSCH or the PUSCH based on the decoded DCI.

6. The non-transitory computer-readable storage medium of claim 5, wherein the type of the wireless device is at least one of:
an industrial sensor device having a communication latency less than 100 milliseconds (ms) and a communication bitrate less than 2 megabits per second (Mbps);
a video surveillance device having a communication latency less than 500 ms and a communication bitrate in a range from 2 to 25 Mbps; or
a wearable device having a communication bitrate in a range from 5 to 150 Mbps.

7. A base station comprising:
one or more processors configured to:
receive an indication of a type of a wireless device from the wireless device communicatively coupled to the base station;
generate downlink control information (DCI) comprising a DCI format based on the type of the wireless device in the received indication, the DCI comprising:
at least one bit string indicating a schedule of a physical downlink shared channel (PDSCH) or a physical uplink shared channel (PUSCH), and a DCI format differentiation bit string indicating the DCI format as one of a reduced-complexity DCI format or a fallback DCI format; and transmit the DCI to the wireless device using a physical downlink control channel (PDCCH).

8. The base station of claim 7, wherein the type of the wireless device is at least one of:
- an industrial sensor device having a communication latency less than 150 milliseconds (ms) and a communication bitrate less than 3 megabits per second (Mbps);
- a video surveillance device having a communication latency less than 750 ms and a communication bitrate in a range from 1.5 to 30 Mbps; or
- a wearable device having a communication bitrate in a range from 4 to 200 Mbps.

9. The base station of claim 7, wherein DCI comprises a bit string indicating a number of repetitions of the DCI specified by the base station, wherein a rate of extracting bit strings from the DCI increases as the number of repetitions of the DCI increases.

10. The base station of claim 7, wherein the DCI comprises a bit string indicating a frequency domain resource allocation (FDRA) specified by the base station, the FDRA comprising a configurable bit string comprising one of 1, 2, 4, or 8 bits, the FDRA indicating a scheduling granularity for a starting point and a length indication for resource allocation.

11. The reduced-complexity wireless device of claim 1, wherein the reduced-complexity DCI format does not include a bit string for one or more of carrier indicator and bandwidth part (BWP) indicator.

12. The reduced-complexity wireless device of claim 1, wherein the reduced-complexity DCI format comprises a bit string for one or more of an identifier for DCI formats, PDSCH repetition number, and a DCI repetition number.

13. The reduced-complexity wireless device of claim 1, wherein the DCI format differentiation bit string is a bit string associated with one of a time-domain resource allocation (TDRA) bit string or a modulation and coding scheme (MCS) bit string.

14. The reduced complexity wireless device of claim 1, wherein the DCI format differentiation bit string encoded in a wireless-device specific search space.

15. The reduced-complexity wireless device of claim 14, wherein the DCI format differentiation bit is encoded in a common search space (CSS).

16. The reduced-complexity wireless device of claim 1, wherein the DCI format for low complexity comprises one of DCI format 0_3 or DCI format 1_3.

17. The non-transitory computer-readable storage medium of claim 5, wherein the reduced-complexity DCI format does not include a bit string for one or more of carrier indicator and bandwidth part (BWP) indicator.

18. The non-transitory computer-readable storage medium of claim 5, wherein the reduced-complexity DCI format comprises a bit string for one or more of an identifier for DCI formats, PDSCH repetition number, and a DCI repetition number.

19. The base station of claim 7, wherein the reduced-complexity DCI format does not include a bit string for one or more of carrier indicator and bandwidth part (BWP) indicator.

20. The base station of claim 7, wherein the reduced-complexity DCI format comprises a bit string for one or more of identifier for DCI formats, PDSCH repetition number, and a DCI repetition number.

* * * * *